United States Patent [19]
Ohnishi

[11] Patent Number: 6,067,169
[45] Date of Patent: *May 23, 2000

[54] COLOR IMAGE PROCESS SYSTEM, COLOR IMAGE APPARATUS, COLOR IMAGE PROCESSING METHOD

[75] Inventor: Tetsuya Ohnishi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,099

[22] Filed: Aug. 25, 1997

Related U.S. Application Data

[63] Continuation of application No. 08/404,756, Mar. 15, 1995, abandoned.

[30] Foreign Application Priority Data

Mar. 15, 1994 [JP] Japan ................................... 6-043902

[51] Int. Cl.[7] ...................................................... H04N 1/46
[52] U.S. Cl. ............................................ 358/1.9; 358/501
[58] Field of Search .................................... 358/500, 501,
358/502, 503, 527, 530, 536, 537, 296,
401, 406, 434, 436, 439, 442, 444, 468,
1.1, 1.9, 1.4, 1.6, 1.15, 1.17; 399/9, 11,
12, 13, 28, 59, 145; 370/366; 395/891;
379/100.01, 102.07, 106.01

[56] References Cited

U.S. PATENT DOCUMENTS

| | | | |
|---|---|---|---|
| 4,689,755 | 8/1987 | Buote ....................................... | 364/131 |
| 4,713,684 | 12/1987 | Kawamura et al. ..................... | 358/530 |
| 4,876,664 | 10/1989 | Bittorf et al. ............................ | 364/131 |
| 4,955,290 | 9/1990 | Kipphan et al. ......................... | 101/183 |
| 5,060,059 | 10/1991 | Mori et al. ............................... | 358/500 |
| 5,124,799 | 6/1992 | Tsuboi et al. ............................ | 358/296 |
| 5,228,118 | 7/1993 | Sasaki ...................................... | 395/112 |
| 5,247,623 | 9/1993 | Sun .......................................... | 395/325 |
| 5,283,657 | 2/1994 | Ichikawa et al. ........................ | 358/296 |
| 5,315,404 | 5/1994 | Kuboki et al. ........................... | 358/433 |
| 5,325,209 | 6/1994 | Manabe .................................... | 358/437 |
| 5,335,191 | 8/1994 | Kundert et al. .......................... | 364/131 |
| 5,398,305 | 3/1995 | Yawata et al. ........................... | 395/101 |
| 5,430,525 | 7/1995 | Ohta et al. ............................... | 355/201 |
| 5,473,355 | 12/1995 | Inui ......................................... | 347/183 |
| 5,481,742 | 1/1996 | Worley et al. ........................... | 395/109 |
| 5,528,376 | 6/1996 | Inoue et al. .............................. | 358/296 |
| 5,528,758 | 6/1996 | Yeh ...................................... | 395/200.08 |
| 5,566,278 | 10/1996 | Patel et al. ............................... | 395/114 |
| 5,568,285 | 10/1996 | Ikeda ....................................... | 358/518 |
| 5,590,245 | 12/1996 | Leamy et al. ............................ | 395/109 |

FOREIGN PATENT DOCUMENTS

| | | |
|---|---|---|
| 0265575 | 5/1988 | European Pat. Off. . |
| 05181590 | 2/1994 | European Pat. Off. . |
| 7052472 | 2/1992 | Japan . |
| 5095492 | 4/1993 | Japan . |
| 2139451 | 11/1984 | United Kingdom . |
| 2197099 | 5/1988 | United Kingdom . |

OTHER PUBLICATIONS

Edge, Christopher J., "High–Resolution Color Direct Digital Hard Copy", Society For Information Display International Symposium Digest Of Technical Papers, vol. XX, pp. 29–31 (May 16–18, 1989).

*Primary Examiner*—Anh-Vinh Nguyen
*Attorney, Agent, or Firm*—Fitzpatrick, Cella, Harper & Scinto

[57] ABSTRACT

A color image processing apparatus stores color image data, and an output device outputs the stored color image data to a connected device. A discriminator discriminates whether the connected device is a device that receives parallel image data or a device that receives color image data, and a controller controls the output device in accordance with the discrimination made by the discriminator.

15 Claims, 12 Drawing Sheets

FIG.11A

CONFIGURATION TABLE

| BYTE \ BIT | 7 | 6 | 5 | 4 | 3 | 2 | 1 | 0 |
|---|---|---|---|---|---|---|---|---|
| 0 | \multicolumn{4}{l}{SLOT 0} | \multicolumn{4}{l}{INTERFACE CODE} |
| 1 | \multicolumn{4}{l}{SLOT 1} | \multicolumn{4}{l}{INTERFACE CODE} |
| 2 | \multicolumn{4}{l}{SLOT 0} | \multicolumn{4}{l}{DEVICE CODE} |
| 3 | \multicolumn{4}{l}{SLOT 1} | \multicolumn{4}{l}{DEVICE CODE} |

FIG.11B

DESCRIPTION OF THE INTERFACE CODE

| A TYPE OF SCANNER PRINTER | INTERFACE CODE |
|---|---|
| CLC | 00H |
| BJ | 40H |
| NO INTERFACE BOARDS | FFH |

FIG.11C

DESCRIPTION OF THE DEVICE CODE

| A TYPE OF ATTACHIED DEVICE | DEVICE CODE |
|---|---|
| CLC1 | 00H |
| CLC2 | 01H |
| BJ | 04H |
| NO ATTACHED DEVICE/A POWER OFF OF ATTACHED DEVICE | FFH |

COLOR IMAGE PROCESS SYSTEM, COLOR IMAGE APPARATUS, COLOR IMAGE PROCESSING METHOD

This application is a continuation, of application Ser. No. 08/404,756 filed Mar. 15, 1995, now abandoned.

BACKGROUND OF THE INVENTION

1. Field of the Invention

The invention relates to a color image processing system, apparatus, and method.

2. Related Art

Digital color copy machines are known and used throughout the world. Such copiers are capable of printing an image through a data interface for an image source, e.g. computer, in addition to the color reader that is included in the digital color copy machine. However, there are various image forming methods for color copy machines, e.g., an electro-photography image forming method, a jet image forming method, and different image data transmission methods are used with each of the different image forming methods. Also, there are various different kinds of interface devices for the different color copy machines.

If an entity has plural kinds of color copy machines, e.g. a copy shop, plural kinds of interface devices are required. The plural kinds of interface devices makes system cost high since most interface devices include a large capacity memory device. The above problems are also associated with having plural kinds of color printing machines.

SUMMARY OF THE INVENTION

An object of the present invention is to provide a color image processing system that is adaptable to various types of connecting interface devices.

Another object of the present invention is to provide a color image processing device for a color image processing system.

Still another object of the present invention is to provide a color image processing method that solve the shortcomings of the prior art.

Still another object of the present invention is to provide a color image processing device which is capable of fast input or output in a color image processing system.

Still yet another object of the invention is to provide a color image processing apparatus which stores color image data, and an output device which outputs the stored color image data to a connected device, and a discriminator which discriminates whether the connected device is a device that receives parallel image data or a device that receives color image data, and a controller controls the output device in accordance with the discrimination made by the discriminator.

Yet another object of the present invention is to provide an interface that is suitable for a digital color copy machine.

The foregoing and still other objects and advantages of the present invention will become fully apparent from the following description, taken in conjunction with the drawings.

BRIEF DESCRIPTION OF THE DRAWINGS

FIG. 11A is a diagram showing a configuration table.

FIG. 11B is a diagram of the interface code.

FIG. 11C is a diagram showing the device code.

PREFERRED EMBODIMENT OF THE INVENTION

Figure 1:
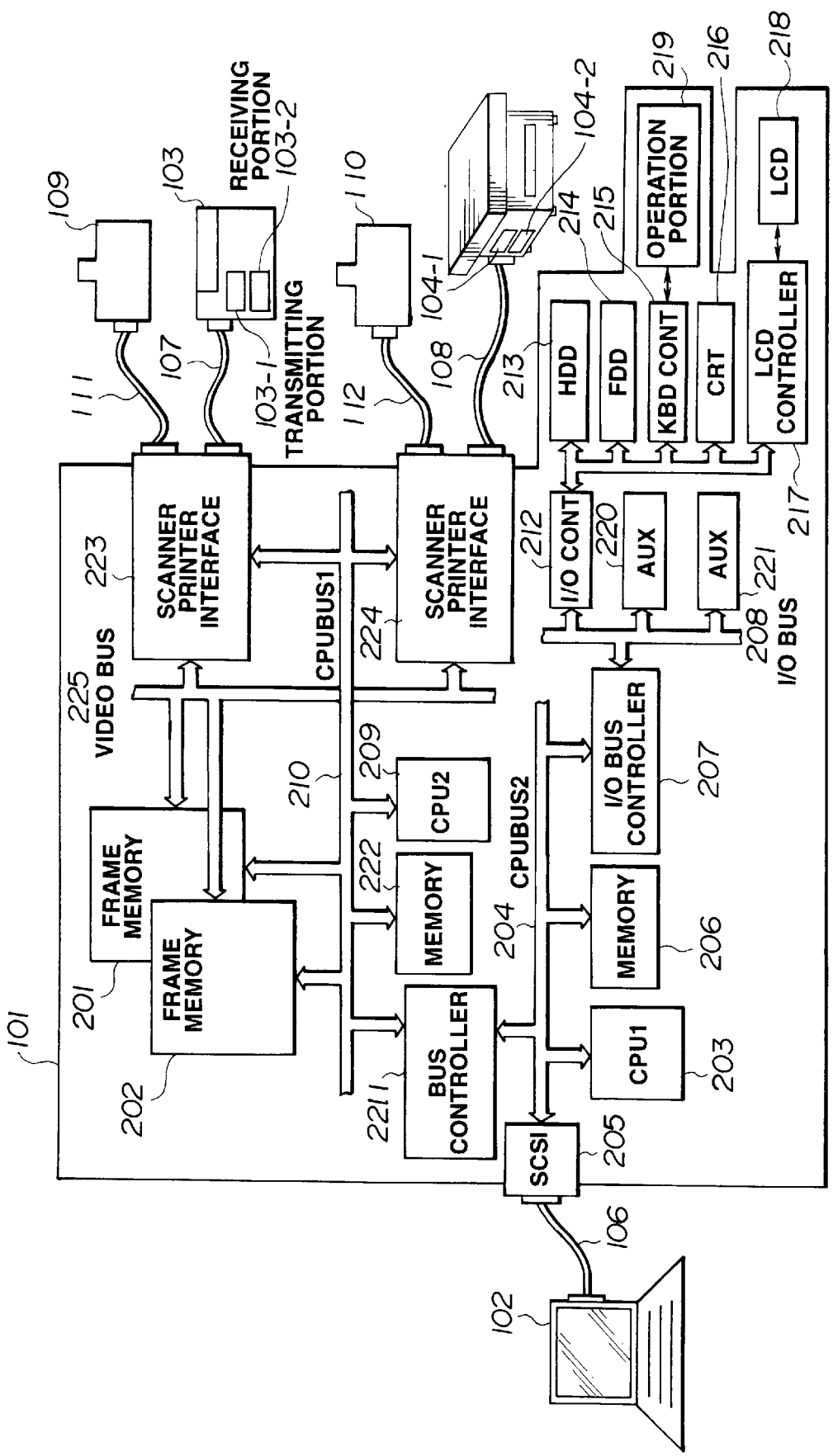
FIG. 1 is a block diagram of a first embodiment of the invention.

Referring to the drawings, a preferred embodiment of the present invention will be described. Referring to FIG. 1, 101 is an interface device and 102 is a host computer connected to interface device 101 through an interface cable 106.

The interface cable 106 is a general-purpose interface, e.g. SCSI. The interface cable 106 transfers color image data produced by the computer 102 to frame memories 201 and 202 within interface device 101 so that color copy machines 103 and 104 print an image corresponding to the transferred color image data.

The interface cable 106 also transmits control commands that controls a portion of, or the entire system.

The digital color copy machines 103 and 104 connect to the interface device 101 through interface cables 107 and 108, respectively. The cables 107 and 108 are provided for printing out an image corresponding to image data stored in frame memory 201, 202. The interface 101 is capable of storing image data from the color reader of the color copy machine 103 or 104 into the frame memories 201 or 202.

The color copy machines 103 and 104 are capable of controlling the interface device 101 and computer 102 through an operational panel that is included in the machines 103 and 104.

Film scanners 109 and 110 scan an image on a developed silver halide film, and are connected to the interface device 101 through interface cables 111 and 112, respectively in place of the film scanners 109 and 110, a video capture device that freezes a standard broadcasting video signal, e.g. NTSC, PAL, HDTV may be connected to the interface device 101, so that the frame memories 201 and 202 can store the standard broadcasting video signal and the color copy machines can print out an image corresponding to a video signal stored in the frame memories 201 and 202.

Other kinds of image data input devices may be connected to the interface device 101 in place of the film scanners 109 and 110.

Each of the color copy machines 103 and 104 is equipped with a receiving circuit 103-1 and 104-1, respectively, that receives color image data from the interface device 101. Each color copy machine is also equipped with a transmitting circuit 103-2 and 104-2, respectively, that transmits color image data to the interface device 101, or a signal that represents a type or kind of image signal that is acceptable to the color copy machine.

In the interface 101 a first CUP 203 controls external I/O except for the scanner and printer. In the first CPU 203 a CPU BUS 204 connects the CPU 203 and a SCSI controller 205 that communicates with the computer 102, program memory 206 that stores operation programs of the CPU 203, and an I/O bus controller 207 that controls an I/O bus 208.

The CPU BUS 204 is also connected to the bus controller 208 so that the first CPU 203 can connect to a CPU BUS 210 of a second CPU 209.

I/O BUS 208 connects to an I/O controller 212 which controls hard disc drive 213, keyboard controller 215, CRT controller 216 and LCD controller 217.

A liquid crystal display device 218 displays a condition of the interface device 101 as required.

An operation portion 219 sets an initial condition of the interface device 101 and a special mode for maintenance by a service man. The keyboard controller 215 is also connected to the operation portion 219.

A monitor display may connect to the interface device 101 through the CRT controller 216, and a keyboard may connect to interface device 101 through the keyboard controller 215.

The I/O BUS 208 is connected to AUX (external device) slots 220 and 221 which are capable of being connected to an interface card, e.g. a card for a CD-ROM, and the interface device 101 stores image data recorded on a CD-ROM into the frame memories 201 and 202. The device 101 controls printing of an image corresponding to the image data stored by the frame memories 201 and 202.

The interface 101 is capable of receiving multimedia information by changing a type of card that is inserted in the slots 201 and 221.

The second CPU 209 is capable of discriminating a type of printer or scanner that is connected to the interface device 101, to process images stored by frame memories 201 and 202, e.g. image rotation, image data compression, and to develop code that represents a letter or a page description language into a rasterized image. A memory 222 stores a control program that is read out from a hard disc drive 212 through BUS controller 211 when power to the device 101 is turned on. The memory 222 also is used for communicating with the first CPU 203.

A CPU bus 210 connects to scanner printer interfaces 223 and 224. The second CPU 209 controls and sets a condition of a scanner or printer of the color copy machines 103 and 104. A Video Bus 225 transmits RGB (Red, Green, Blue) parallel data.

Details of the Video Bus 225, frame memories 201 and 202 and scanner printer interfaces 223 and 224 are shown in FIG. 2. Since the Video Bus 225 transmits only color image data, the Bus 225 is capable of transmitting this RGB color image data at high speed.

In the present embodiment, two kinds of interfaces are connected to the interface device 101, so various kinds of color copy machines can use the same frame memories 201 and 202.

The scanner printer interfaces 223 and 224 can easily be detached from the interface device 101 so that a user can replace them by another interface device based on a kind of color copy machine or data transmitting rate of the color copy machine. Therefore, the interface device 101 can be adapted to a machine of the future.

As shown in FIG. 2, each frame memory 201 and 202 includes three memory planes that store multivalue data e.g. RGB respectively. Data writing, data reading and data storing to the memories are controlled by memory controllers 301 and 302, respectively. The frame memories 201 and 202 operate independently, for instance data is read from one of them for printing and the other one receives data from the computer 102, or receives rasterized image data developed from a command described by a page description language, or is used for image rotation or image compression by CPU 209. The two frame memories 201 and 202 are combined, so that a user may use them as a single memory.

For example, if each of two frame memories 201 and 202 has a capacity of A4 size, a capacity of a memory made up of two memories will be A3 size.

A log convertor 304 converts input RGB data into CMY (Cyan, Magenta, Yellow) data. A color signal processor 305 performs color masking processing and under color processing on the CMY data and for out putting color masking processed CMYK frame sequential image data, which is suitable to a color reproduction characteristic of a color printing engine of a color copy machine connected to the interface device 101. An output controller 330 of the scanner printer interface 223 is shown in detail in FIG. 2B. Referring to FIG. 2B, a selector 331 selects either one of the CMYK frame sequential image data output by the color masking processor 305 or the R signal on Video Bus 225 in accordance with a control signal 335 from controller 303. Gates 332 and 333 operate in accordance with the control signal 335 to select either the G signal or the B signal.

Figure 2A:
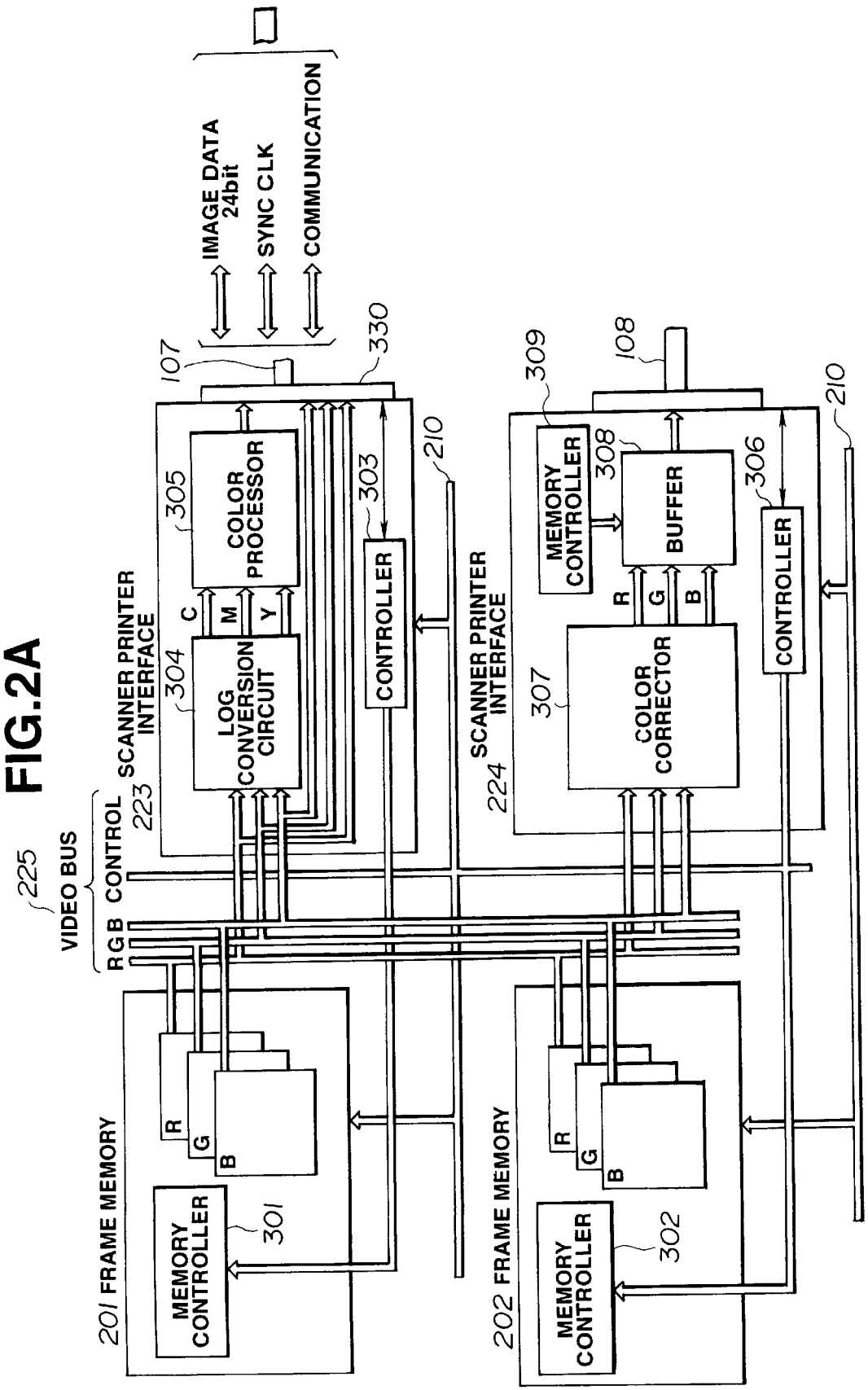
FIG. 2A is a detail diagram of a part of FIG. 1.
Figure 2B:
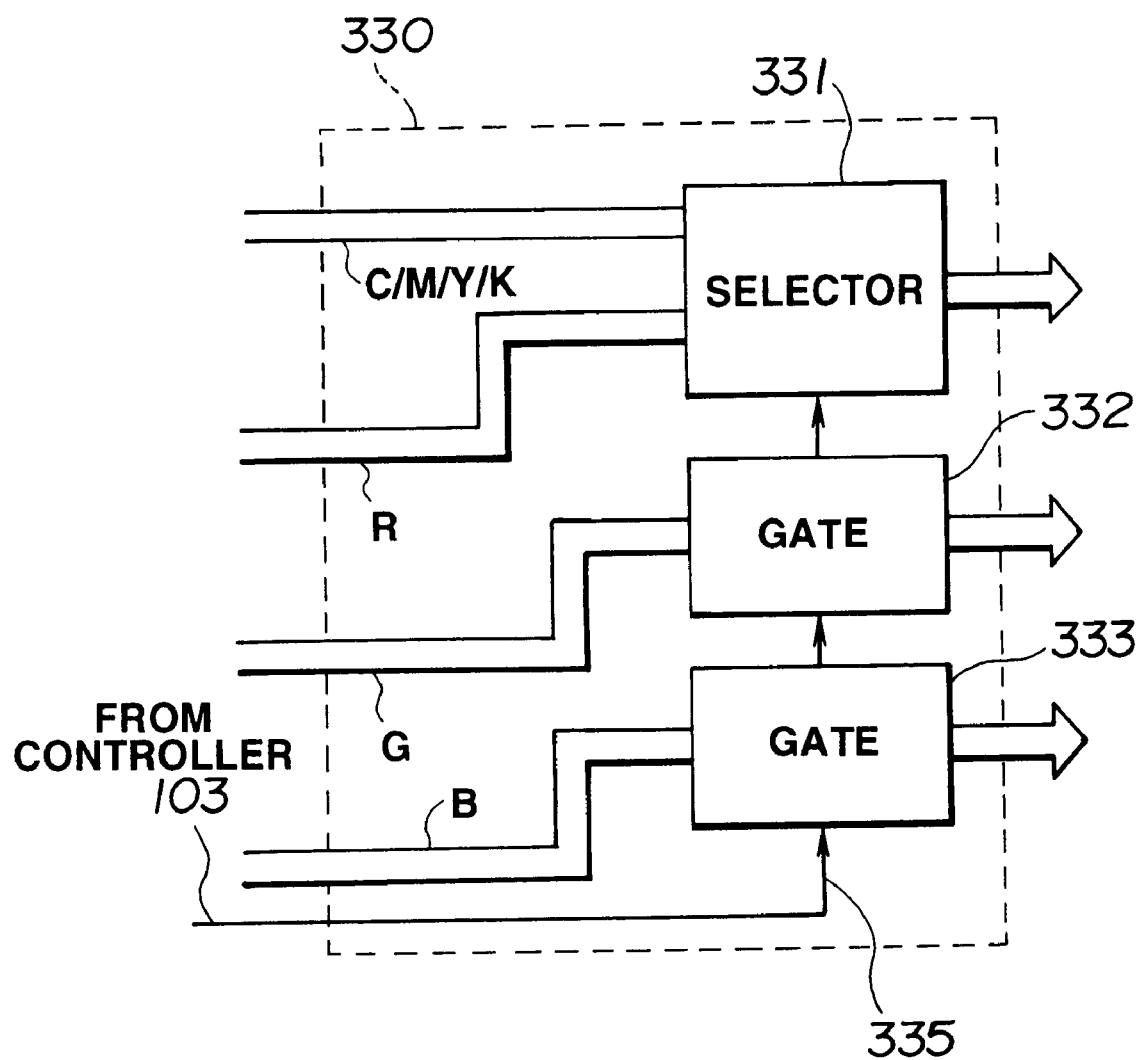
FIG. 2B is a detailed diagram of the controller 330 of FIG. 2A.

The detailed operation of the structure shown in FIGS. 1, 2A and 2B is described below.

In the present embodiment, a scanner printer interface 223 is connected by a cable 107 to a color copy machine 103 that has a frame sequential image forming engine, and a scanner printer interface 224 is connected by a cable 108 to a color copy machine 104 that has a dot sequential image forming engine.

In this case, controllers 303 and 306 cause the second CPU 209 to discriminate the type of the color copy machine connected to the interface device 101 by mutual communication between the interface device 101 and the color copy machine.

For example, in the case that color copy machine 103 is connected, a print out based on the information from the interface device 101 indicates that frame sequential color image data will be required. On the other hand, in the case that color copy machine 104 is connected, a print out based on the information from the interface device 101 indicates that dot sequential color image data will be required.

An operation of the present embodiment in the case that the color copy machine 103 is connected, based on the information from the interface 101 is described below.

Initially, the computer 102 generates a print command, and the CPU 203 receives the print command. The first CPU 203 interprets the command and writes its content in memory 222 under control of bus controller 211. When the second CPU 209 recognizes writing into the memory 222 by the first CPU 203, the second CPU 209 reads the content of the memory 222, and operates in accordance with the command. For instance, the second CPU 209 order the controller 303, within the scanner printer interface 223, to generate a print command for the color copy machine 103. The controller 303 communicates with the color copy machine 103 and generates the print command and transmits it through cable 107.

In the present embodiment, cables 107, 108, 111 and 112, are of the same construction, such that one cable contains bidirectional lines for transmitting 24 bit image data, a bidirectional synchronizing signal line, bidirectional clock line, and a bidirectional command communication line.

When the color copy machine 103 receives the print command, it starts operation of a printing engine that includes the color copy machine 103, and simultaneously transmit an image synchronizing signal that synchronizes operation of the printing engine with the interface device 101.

The controller 303 outputs an image data request signal to the memory controller 301 on the control bus within the Video Bus 225, in response to the image synchronizing signal. The memory controller 301 outputs image data from memory RGB in response to the image data request signal as a RGB 24 bit parallel signal that includes a 8 bit, R signal, a 8 bit G signal and a 8 bit B signal through a RGB video bus within the Video Bus 225. The RGB bit parallel signals are input to a log conversion circuit 304 within the scanner printer interface 223 and the conversion circuit 304 converts RGB data into CMY data. After that, the color processor 305 performs a masking process and an under color process suited to a color reproducing characteristic of the color copy machine 103 in order to reproduce a color image more exactly, and the processor 305 outputs cyan, magenta, yellow and black. The color copy machine 103 develops later images frame sequentially in order of magenta, cyan, yellow black.

The controller 303 controls the selector 331 to select either cyan, magenta, yellow and black data, or red data as shown in FIG. 2B, and turns on gates 332 and 333 so as to select green and blue data when red data is selected by selector 331.

Therefor, frame sequential color image signals are transmitted through a 8 bit line within the lines for transmitting 24 bit image data, and the memory controller 301 repeats the reading operation from the RGB memory four times in synchronization with a synchronizing signal from the color copy machine 103, and the scanner printer interface 223 outputs a magenta, cyan, yellow and black color image signal frame sequentially.

Figure 3:
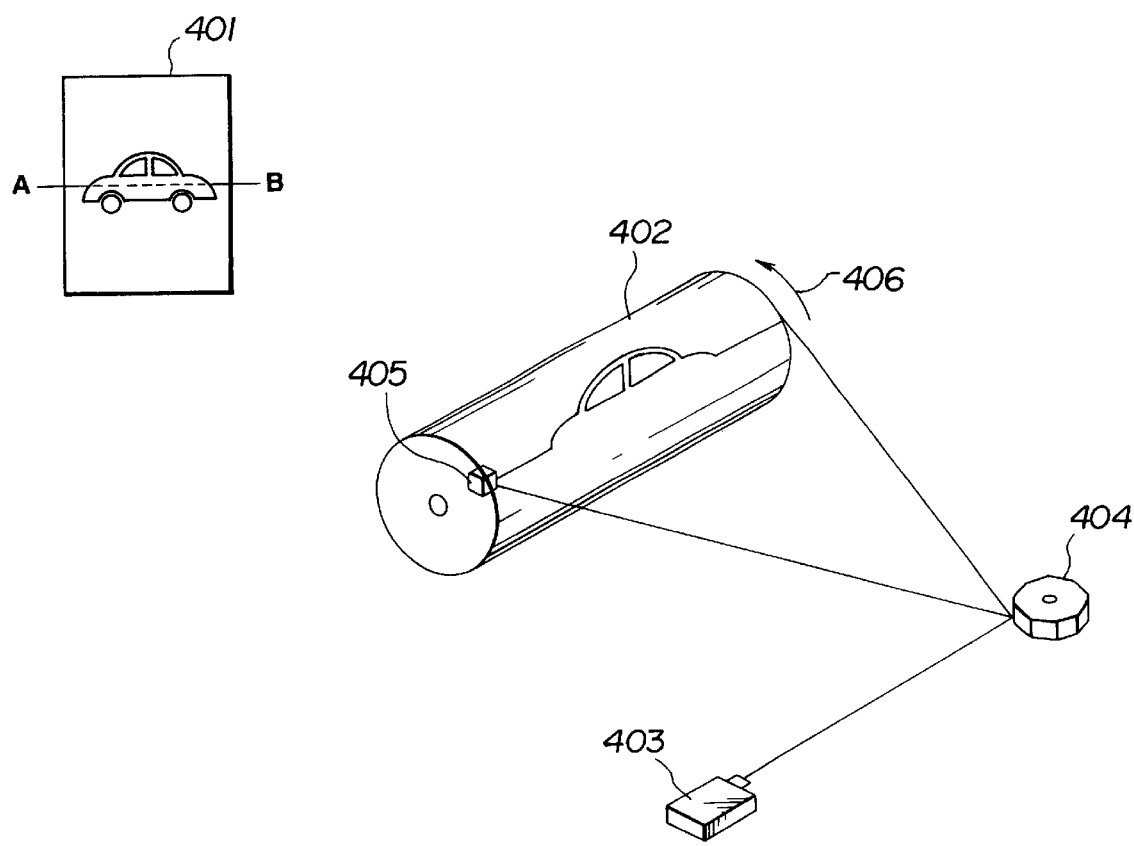
FIG. 3 is a perspective diagram of the printing engine of the color copy machine 103 shown in FIG. 1.

FIG. 3 is a perspective diagram of the printing engine of the color copy machine 103.

An image data 401 is stored by frame memory 101 or 202. A laser generator 403 generates a laser beam in response to a given image signal, for forming a latent image on a photosensitive DRAM 402 using a laser beam detector 404. The photosensitive DRAM 402 rotates in the direction of arrow 406.

Figure 4:
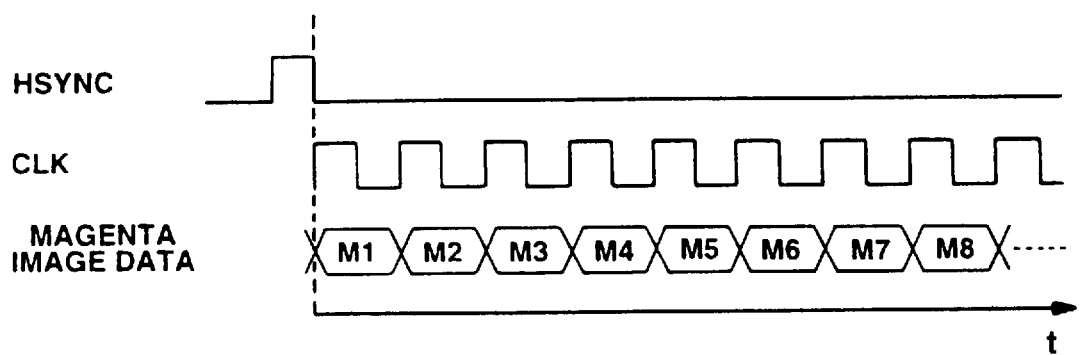
FIG. 4 is a timing chart for describing a data transmission to the printing engine shown in FIG. 3.

FIG. 4 is a timing chart for explaining an operation of the printing engine. HSYNC is produced from the output of the laser beam detector 406. CLK is a clock magenta image data M1, M2, M3 . . . which are supplied to the laser generator 403.

The laser generator 403 generates a laser beam based on the given image data, e.g. magenta image data shown in FIG. 4. The image data is supplied in synchronism with a clock CLK that is synchronized with HSYNC produced from the output of the laser beam detector 404.

Repeating the scan of the laser beam, generated by laser generates 403, forms an image of each of four color components magenta, cyan, yellow and black. Therefore, the above operation is repeated four times. In the above description, the color copy machine receives a frame sequential color image signal of magenta, cyan, yellow and black, by way of the log conversion circuit 304 and the color processor 305 in the interface device 101.

However, the interface device 101 may output RGB 24 bit parallel signals to a color copy machine, and the color copy machine processes the RGB parallel signals by a log conversion circuit and a color processor that are provided within the color copy machine. In that case, the interface device 101 discriminate between a color copy machine that receive the frame sequential color image data, e.g. CMYK and a color copy machine that receive RGB parallel image data. The selector 331, the gates 332 and 333 (FIG. 2B) and memory controller 301 (FIG. 2A) are controlled in accordance with a discrimination result so that the frame sequential color image data is output to the color copy machine that receives the frame sequential color image data through lines either of eight bits or 24 bits. RGB parallel image data is output to the color copy machine that receives RGB parallel image data through all of the 24 bit lines.

Figure 7:
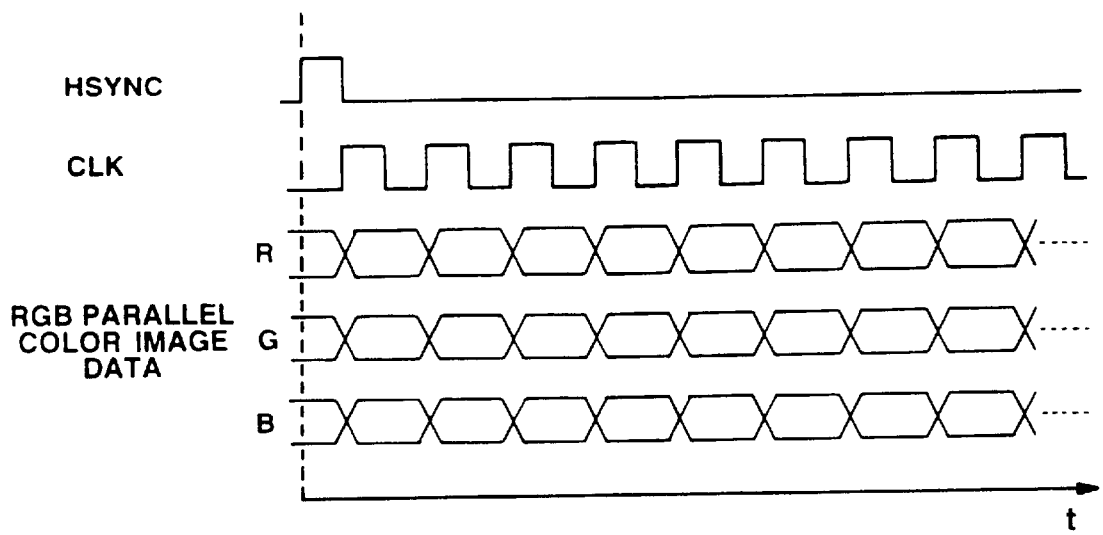
FIG. 7 is a timing chart for describing another data transmission to the printing engine shown in FIG. 3.

FIG. 7 is a timing chart for describing RGB parallel image data from interface device 101 to a color copy machine.

In the case that a color copy machine has a frame sequential color printing engine, the interface device 101 automatically supplies the RGB parallel image data repeatedly three or four times.

When a color image data, from a color scanner that is included in the color copy machine, is written into the frame memory 201, RGB parallel color image data output by the color scanner is transmitted through all of the 24 bit lines, the scanner printer interface 223, and Video Bus 225. At that time the controller 303 outputs a write request signal to the controller 301 through the control bus of the Video Bus 225 to the color copy machine 104.

The output of color connector 307 is written into buffer memory 308 under the control of controller 309. A memory capacity of the buffer memory 308 is for one band 502 as shown in FIG. 5.

At that time, a print starting command is supplied to the color copy machine 104. The color copy machine 104 starts an operation of a printing engine and simultaneously transmits an image synchronizing signal to the interface device 101.

The image synchronizing signal is supplied to the memory controller 309. The memory controller 309 converts the RGB 24 bit parallel image data into a RGB dot sequential image signal and outputs the RGB dot sequential image data to the color copy machine 104 in synchronism with the image synchronizing signal.

Figure 5:
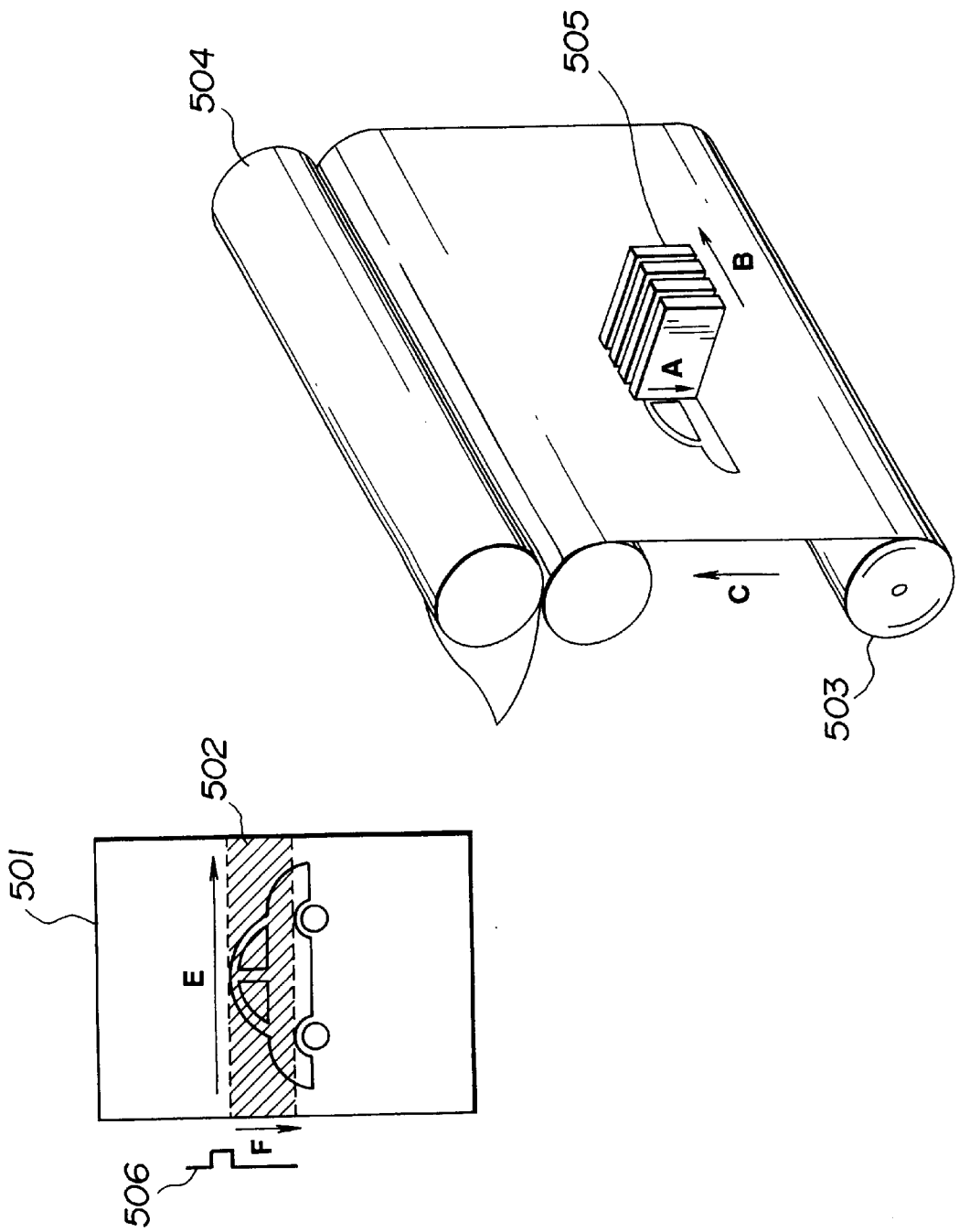
FIG. 5 is a perspective diagram of the printing engine of the color copy machine 104 shown in FIG. 1.

FIG. 5 is a perspective diagram of the printing engine of the color copy machine 104 shown in FIG. 1.

Referring to FIG. 5, an image data 501 is stored by a frame memory 201 or 202, and includes a part 502 that is substantially simultaneously supplied to an ink jet printing head 505. A roller 504 feeds a rolled paper 503 at predetermined intervals that correspond to the part 502 in the direction of the arrow C shown in FIG. 5.

An operation of the present embodiment in case that the color copy machine 104 whose printing method is a bubble jet printing method is described below.

Similar to the above description, the computer 102 generates a print command, the controller 306 communicates with the color copy machine 104 in accordance with the print command and outputs an image data request signal to the memory controller 301 through the control bus within the Video Bus 225.

The memory controller 301 outputs image data from memory in RGB in response to the image data request signal as RGB 24 bit parallel signals. The RGB signals are processed by a color corrector 307 in order to conform to a color reproducing characteristic of the controller 301 to write an image data transmitted by the Video Bus 225 into the RGB memories.

The above description was with respect to the frame memory 201, however, the frame memory 202 operates in a similar manner to the frame memory 201. For example, when memory controller 303 output a write request signal to the controller 302 within the frame memory 202, frame memory 202 write a given image data through Video Bus 225 to the RGB memories.

In order to avoid conflict on a bus between the controller 303 and the controller 304, scanner printer interfaces 223 and 224 do not operate simultaneously.

The ink jet heads 505 comprise four kinds of inkjet heads, for instance a magenta head, a cyan head, a yellow head and a black head. The ink jet heads 505 are moved by a known construction in the direction of arrow B shown in FIG. 5.

After the part 502 of image data is transferred to the buffer memory 308 from the frame memory 201 or 202, RGB dot sequential color image data is transferred to the printing engine shown in FIG. 5 from the buffer memory 308 through 8 bit lines or 24 bit lines within a cable 108.

Figure 6:
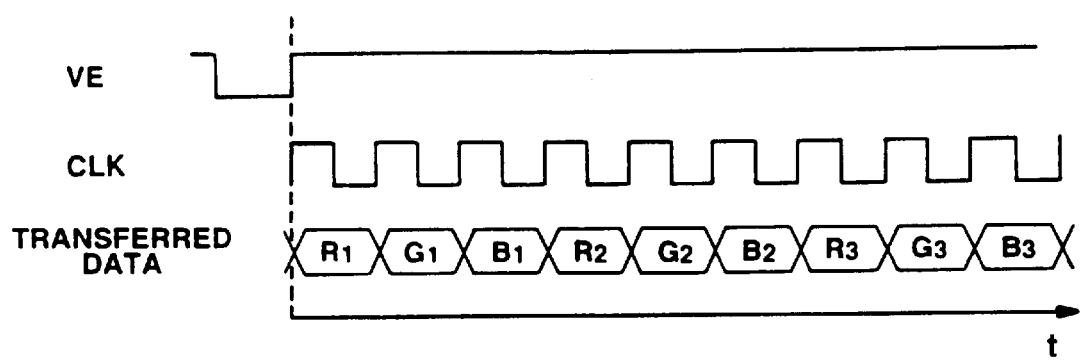
FIG. 6 is a timing chart for describing a data transmission to the printing engine shown in FIG. 5.

FIG. 6 is a timing chart for describing a data transmission to the printing engine shown in FIG. 5. Referring to FIG. 6, VE is a synchronizing signal, and CLK is a clock. Transferred data is a dot sequential color image data that is transferred from the buffer memory 308 to the printing engine shown in FIG. 5.

Figure 8:
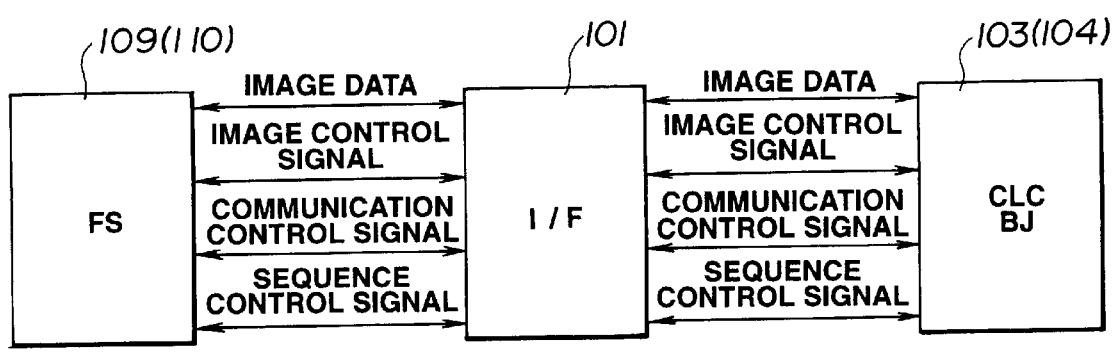
FIG. 8 is a diagram for describing information transfer between the film scanner 109 (110), the interface device 101 and the color copy machine 103 (104).

FIG. 8 is a diagram for describing information transfer between a film scanner 109 (110), an interface device 101 and the color copy machine 103 (104).

Referring to FIG. 8, image data corresponds to the image data shown in FIG. 2A transmitted by the 24 bit lines. Image control signals corresponds to the SYNC CLK shown in FIG. 2A, and the control signals include a pixel synchronizing clock, a line synchronizing clock, and a page synchronizing clock.

Communication control signals and sequence control signals correspond to the communication signals shown in FIG. 2A. The communication control signals include a command for ordering an operation and status for noticing a condition of a device, and the command and status signals are transmitted by serial communication. The sequence control signal is a signal for transmitting information that represents a power condition of a device.

Figure 9:
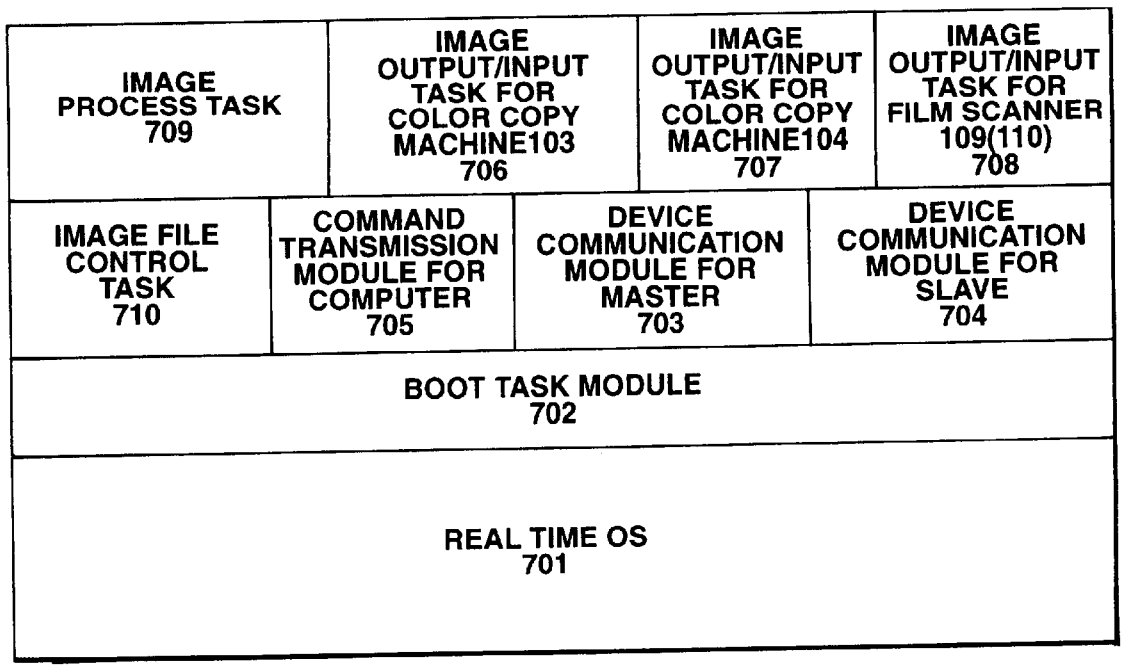
FIG. 9 is a diagram showing a module construction of a control program that drives the second CUP 209 of FIG. 1.

FIG. 9 is a diagram showing a module construction of a control program that drives the second CPU 209. Referring to FIG. 9, module 701 is a real time OS for managing plural tasks, each of which is event driven. Module 702 is a Boot task that is operated when the main control program starts. The module 702 makes an initial setting of the frame memory, parameters that are used in the main control program, and various ICs that are used in the interface device 101. The module 702 also discriminates the type of the scanner printer interface.

Modules 703 and 704 are provided for controlling a communication between the interface device 101 and the color copy machine. The module 703 is a communication task that the interface device 101 transmits a command, and the color copy machine returns its status, in other words, the interface device is a master, and the color copy machine is a slave.

In contrast, the module 704 is a communication task that the color copy machine transmits commands and the interface device 101 return its status, Module 705 manages command transmission between the first CPU 203 and the second CPU 209, and image data transmission. The module 705 causes the second CPU 209 to receive a command from computer 102 shown in FIG. 2, to interpret the received command, and to start the communication tasks or an image process task described later.

Modules 706, 707 and 708 are image input/output control tasks for the color copy machine 103, the color copy machine 104, and the film scanner 109 (110), respectively. Module 709 manages image processing e.g. image data compression, expansion, rotation, mirror image process, color space compressions and color space conversion. Module 710 manages a file of image data stored in frame memories 201 and 202.

Figure 10:
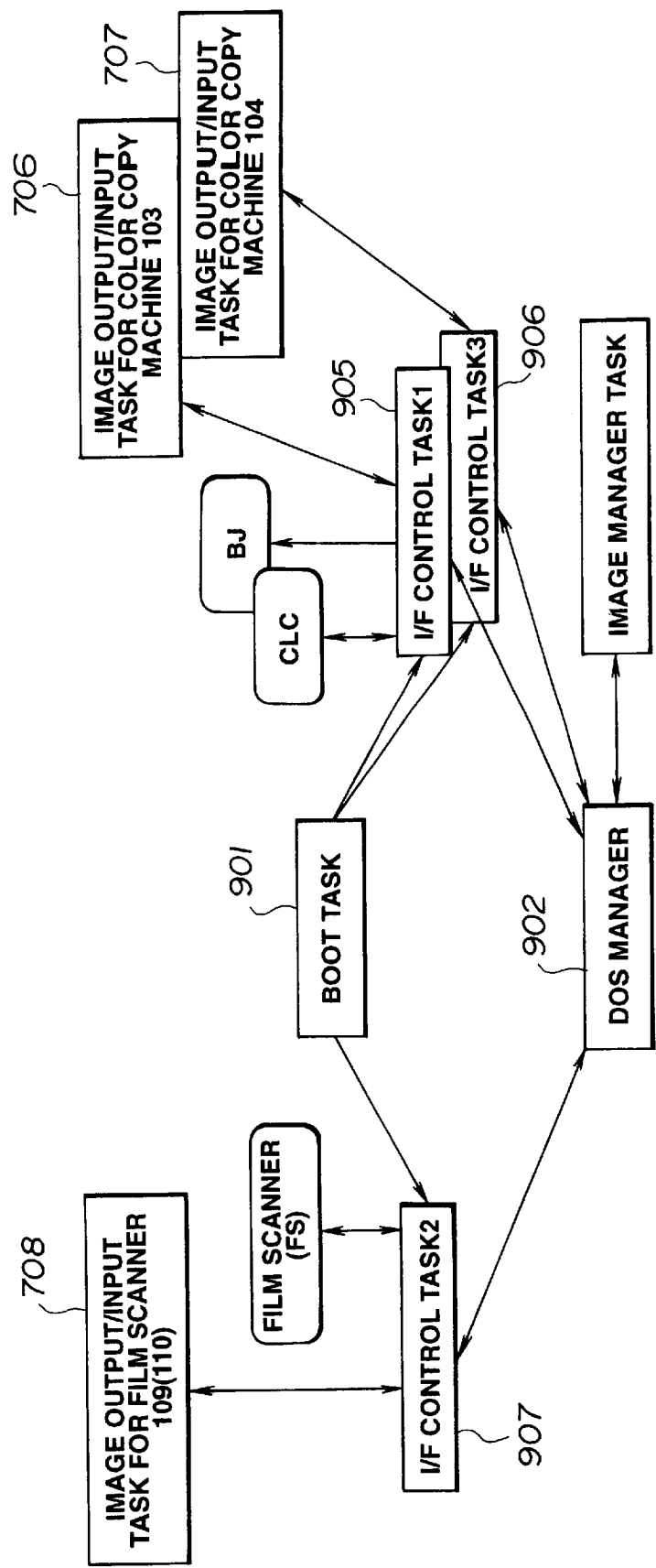
FIG. 10 is a diagram showing a software construction of the interface device 101 of FIG. 1.

FIG. 10 is a diagram showing the software construction of the interface device 101. The operation of the software shown in FIG. 10 is described below.

After power of the device 101 is turned on, the module 701, the real time OS, is started, so that tasks 901 and 902 shown in FIG. 10 are performed. The task 901 controls the Boot task Module 702, so that the boot task initially set has an identifying code of either one of 00H, 40H and FFH in an interface code of a configuration table shown in FIG. 10. Ports for representing the identifying codes are provided with the scanner printer interfaces 223 and 224. The ports are set between ground or open in accordance the type of scanner printer interface. In other words, the identifying code for the type of scanner printer interface is set by hardware rather than software.

Therefore, the CPU 209 can initially discriminate the identifying code of an attached scanner printer interface and set the identifying code in the interface code of the configuration table shown in FIG. 10. The identifying code represents an information communication type that the attached scanner printer interface shown in FIG. 4, FIG. 6 and FIG. 7 can operate.

CPU 209 discriminates a power condition of an attached device, e.g. the color copy machine, by detecting the sequence control signal shown in FIG. 8 through predetermined ports of the scanner printer interfaces 223 and 224. If the power of the attached device is ON, CPU 209 operates either one of communication control tasks 905, 906 and 907 in accordance with the identifying code set in the interface code of the configuration table shown in FIG. 10. The tasks 905, 097 control communication between the interface device 101 and an attached device, since the interface device is master. For instance, the interface device 101 periodically transmits commands to the attached device, and the attached device return its status in response to the transmitted command. The task 906 controls communications between the interface device 101 and an attached device, since the attached device is master. For instance, the attached device periodically transmits commands to the interface device 101, and the interface device returns its status in response to the transmitted command.

As described above, communication between the attached device and the interface device 101 is performed. The CPU 209 sets device codes shown in the configuration table shown in FIG. 1 in accordance with given information through the communication between the attached device and the interface device. Task 902 operates the command transmission module 705 so that the commands from the computer are interpreted. If a print or scan command is interpreted, the CPU 209 starts one of the image output/input tasks 706, 707 and 708 through one of the I/F control task 1 905, I/F control task 2 906, or I/F control task 907 in accordance with a result of the interpretation by the module 705. At this time CPU 209 selects a slot that connects a scanner and printer interface that is suitable to a given command from computer 102.

Therefore the interface device can perform an appropriate image output/input task with color copy machines 104 and 103 or film scanner 109 (110). In case that both side document reading is designated by a parameter together with a scan command, that command will be performed by using a A.D.F. function (Auto Document Feeder). However, in the case that the either one side of the document is all white, substantially reading, e.g. storing read information into a memory, is prohibited by the CPU 209.

In case that a given command cannot be performed because an attached device is not suitable to perform the given command, the CPU 209 performs an adequate error recovery, e.g. displaying an error condition to the user.

As described above, the CPU 209 discriminates a type of scanner printer interface device to the interface attached device 101, and a result of the discrimination is stored in byte 0.1 in the memory 222 shown in FIG. 1, as the Configuration Table shown in FIG. 11.

If a color copy machine is connected to the interface device 101, the CPU 209 also discriminate a type of attached color copy machine, for instance whether a master device that periodically transmits a command (in the present embodiment, an electrophotography color copy machine, however, the present invention is not limited to that machine) or a slave device that receives a command and return its status (in the present embodiment, a bubble jet color copy machine, however, the present invention is not limited to that machine).

The interface device 101 communicates with an attached device as a slave type device when the attached device is a master type device, and as a master type device when the attached device is a slave type device.

According to the above communication between the interface device 101 and the attached device, the interface device discriminates the type of data transmission that the attached device receives, among the types shown in FIGS. 4, 6 and 7. The type of data transmission discriminated by the CPU 209 is stored in bytes 2 and 3 in the memory 222 shown in FIG. 1 and the Configuration Table shown in FIG. 11.

The interface device 101 outputs magenta, cyan, yellow and black color image signals frame sequentially when the device code is "00H"(the type of attached device is CLC 1), the device 101 outputs a RGB 24 bit parallel signal when the device code is "01H" (the type of attached device is CLC 2), and the device 101 outputs a RGB dot sequential image signal when the device code is "04H" (the type of attached device is a bubble jet printer).

According to the above described embodiment, an interface device can connect various kinds of devices by changing a type of data transmission based on the type of attached device.

Alternative Preferred Embodiments

In above embodiment, buffer memory 308 and memory controller 309 are provided in order to change a type of data transmission from the type shown in FIG. 7 to the type shown in FIG. 6. However, the memory controller 301 or 302 within the frame memories 201 and 202 can operate as the memory controller 309 does by changing a reading order from the RGB memories or writing order to the RGB memories.

In above embodiment, color copy machines are described as the attached device, however, the present invention is not limited to color copy machines. Printers that have only a printing function are also covered by the present invention.

The printing engine shown in FIG. 3 is described as a frame sequential printer, however this invention is not limited to such a printer. The present invention also covers other kinds of frame sequential printers, e.g. frame sequential thermal printers, or frame sequential inkjet printers.

A RGB 24 bit parallel signal is described as parallel color image data, however this invention is not limited to such data. The present invention also covers Lab data, YIQ data, Y, Cr, Cu. data and YMCK data.

The sequential color image signal also is not limited to the embodiment, as this invention also covers a dot sequential color signal or a line sequential color signal.

The type of attached device may be discriminated by bidirectional communication or one directional communication.

A printer or copy machine that deposits liquid by thermal energy is preferred as the color copy machine 103.

In this specification "command" means the information that a device voluntarily outputs, and is not limited to orders for operation, and "status" means information that is output based on a received command, and also covers orders for operation, and is not limited to information that represents a condition of the device.

According to the present invention, a color image processing system operates in accordance with the type of attached device. In particular, since parallel color image data and sequential color image data is selected in accordance with the type of attached device, a flexible color image processing system is provided.

According to the present invention, since a reading means for reading a color data is controlled in accordance with the type of attached device, the reading operation from the memory is made more efficient.

While the present invention has been described with respect to what are at present the preferred embodiments, it is to be understood that the invention is not limited to those embodiments. To the contrary, the invention includes various modifications and equivalent arrangements included within the spirit and scope of the appended claims. The scope of the following claims is to be accorded the broadest interpretation so as to encompass all modifications and equivalent structures and functions.

I claim:

1. A color image processing apparatus which interfaces an image inputting means to an image outputting means, comprising:

image inputting means for inputting color image data;

storing means for storing the color image data input by said image inputting means;

outputting means for outputting color image data from said storing means to the image outputting means;

discriminating means for discriminating whether the image outputting means receives parallel color image data, frame sequential image data, or dot sequential color image data based on an identification code for the image outputting means;

converting means for converting a color space of the color image data prior to output to said image outputting means based on the identification code; and controlling means for controlling said outputting means in accordance with a discrimination made by said discriminating means.

2. Color image processing apparatus according to claim 1, wherein the frame sequential color image data includes frame sequential plural color components for image forming.

3. Color image processing apparatus according to claim 2, wherein the plural color components include a yellow component, a magenta component and a cyan component.

4. Color image processing apparatus according to claim 1, wherein the dot sequential color image data includes a red component, a green component and a blue component.

5. Color image processing apparatus according to claim 1, wherein said discriminating means discriminates by bidirectional communication between said color image processing apparatus and the connected device.

6. Color image processing apparatus according to claim 1, wherein said controlling means controls said outputting means so that said outputting means outputs parallel color image data when said discriminating means discriminates that the connected device is a device that receives parallel color image data.

7. Color image processing apparatus according to claim 1, wherein said controlling means controls said outputting means so that said outputting means outputs sequential color image data when said discriminating means discriminates that the connected device is a device that receives sequential color image data.

8. Color image processing apparatus according to claim 1, wherein the parallel color image data is RGB parallel color image data.

9. A color image processing apparatus which processes images received from an interfacing means which interfaces the color image processing apparatus to an inputting means for inputting color image data, comprising:
   transmitting means for transmitting an identification code to the interfacing means that represents whether said color image processing apparatus receives parallel color image data, frame sequential color image data, or dot sequential color image data, and that represents a color process function; and
   receiving means for receiving color image data from the interfacing means after transmitting the identification code via said transmitting means.

10. Color image processing apparatus according to claim 9, further comprising:
    image forming means for forming an image based on the color image data received by said receiving means.

11. Color image processing apparatus according to claim 9, wherein the frame sequential color image data includes frame sequential plural color components for image forming.

12. Color image processing apparatus according to claim 11, wherein the plural color components include a yellow component, a magenta component and a cyan component.

13. Color image processing apparatus according to claim 9, wherein the dot sequential color image data includes a red component, a green component, and a blue component.

14. Color image processing apparatus according to claim 9, wherein the parallel color image data is RGB parallel color image data.

15. A color image processing system comprising:
   a) a first color image processing apparatus which interfaces a second color image processing apparatus to an image outputting means, comprising:
      image inputting means for inputting color image data;
      storing means for storing the color image data input by said image inputting means;
      outputting means for outputting color image data from said storing means to the second color image processing apparatus;
      discriminating means for discriminating whether the second color image processing apparatus receives parallel color image data, frame sequential color image data, or dot sequential color image data based on an identification code for the second color image processing apparatus;
      converting means for converting a color space of the color image data prior to output to said image outputting means based on the identification code; and
      controlling means for controlling said outputting means in accordance with a discrimination of said discriminating means; and
   (b) a second color image processing apparatus which processes color image data received from said first color image processing apparatus, comprising:
      transmitting means for transmitting the identification code to said first color image processing apparatus; and
      receiving means for receiving the color image data output by said outputting means of said first color image processing apparatus after transmitting the identification code.

* * * * *

UNITED STATES PATENT AND TRADEMARK OFFICE
CERTIFICATE OF CORRECTION

PATENT NO. : 6,067,169
DATED : May 23, 2000
INVENTOR(S) : Ohnishi

It is certified that error appears in the above-identified patent and that said Letters Patent is hereby corrected as shown below:

COVER PAGE:

Under FOREIGN PATENT DOCUMENTS:

"7052472" should read --7-052472--; and
"5095492" should read --5-095492--.

COLUMN 2:

Line 22, "EMBODIMENT" should read --EMBODIMENTS--.

COLUMN 5:

Line 45, "101" should read --201--.

COLUMN 8:

Line 46, "097" should read --and 907--.

Signed and Sealed this

Twenty-second Day of May, 2001

Attest:

NICHOLAS P. GODICI

Attesting Officer     Acting Director of the United States Patent and Trademark Office